(12) United States Patent
Whitney (10) Patent No.: US 9,314,934 B2
(45) Date of Patent: Apr. 19, 2016

(54) GRAVITY-COUNTERBALANCED ROBOT ARM

(71) Applicant: DISNEY ENTERPRISES, INC., Burbank, CA (US)

(72) Inventor: John P. Whitney, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 240 days.

(21) Appl. No.: 14/191,611

(22) Filed: Feb. 27, 2014

(65) Prior Publication Data

US 2015/0239133 A1  Aug. 27, 2015

(51) Int. Cl.
*B25J 19/00* (2006.01)

(52) U.S. Cl.
CPC .............. *B25J 19/002* (2013.01); *Y10S 901/48* (2013.01); *Y10T 74/20305* (2015.01)

(58) Field of Classification Search
CPC ...... B25J 9/0006; B25J 9/0003; B25J 9/0078; B25J 9/10; B25J 9/102; B25J 9/104; B25J 9/1055; B25J 9/12; B25J 9/126; B25J 9/1607; B25J 9/1638; B25J 19/0008; B25J 19/0016; B25J 19/002; B60K 17/16; B60K 17/165; B60K 17/18; B60K 17/20; B66D 1/22; B66D 1/70; D07B 2301/204; F16H 2019/0609; F16H 37/00; F16H 37/02; F16H 37/021; F16H 37/08; F16H 37/0833; F16H 57/0493; F16H 57/0483; G09F 19/08; G09F 2019/086; A63H 13/12; G01L 1/08; G01L 5/168
USPC ................................... 74/490.1; 475/184, 230
See application file for complete search history.

(56) References Cited

U.S. PATENT DOCUMENTS 3,601,260 A * 8/1971 Guennec .................... B25J 3/00
                                                                    414/1
4,259,876 A * 4/1981 Belyanin .................. B25J 9/046
                                                                    414/7

(Continued)

FOREIGN PATENT DOCUMENTS

NL         1009886        2/2000

OTHER PUBLICATIONS

LaCasse et al "On the design of a statically balanced serial robot using remote counterweights", 2013 IEE International Conference on Robotics and Automation (ICRA), Karisruhe, Germany, May 6-10, 2013.

*Primary Examiner* — William Kelleher
*Assistant Examiner* — Leonard J Archuleta
(74) *Attorney, Agent, or Firm* — Marsh Fischmann & Breyfogle LLP; Kent A. Lembke (57) ABSTRACT

An arm assembly for use in a robot to provide gravity counterbalancing of the robot arms. The arm assembly includes an arm and a drive assembly. The arm assembly includes a differential interconnecting the drive assembly with the arm link. The differential is attached to a torso-side or upper end of the arm link, and the differential is adapted to provide gravity counterbalancing for the predefined mass of the arm link. A pair of half counterweights are provided and arranged to each move in one degree of freedom and to provide two equal counterweights to the differential's two inputs such as input gears, pulleys, or the like. The drive assembly includes two motors that are grounded. In some embodiments, both the motors and the counterweights are spaced apart from the robot's shoulder, i.e., spaced apart from the differential near the robot's pelvis or low in the torso.

16 Claims, 9 Drawing Sheets

(56) References Cited

U.S. PATENT DOCUMENTS

| | | | | |
|---|---|---|---|---|
| 4,717,303 A * | 1/1988 | Kawai | ................... | B25J 9/0006 414/1 |
| 5,207,114 A * | 5/1993 | Salisbury, Jr. | ............ | B25J 9/046 414/7 |
| 5,528,417 A * | 6/1996 | Nakamura | ............ | A61B 19/26 359/368 |
| 5,697,256 A * | 12/1997 | Matteo | ................... | B25J 9/104 475/210 |
| 5,825,536 A * | 10/1998 | Yasunaga | ............ | F16M 11/105 248/123.11 |
| 6,122,981 A * | 9/2000 | Matteo | ................... | B25J 9/102 74/490.04 |
| 6,354,167 B1 * | 3/2002 | Snow | ................... | B25J 9/042 248/648 |
| 6,821,259 B2 | 11/2004 | Rahman et al. | | |
| 6,985,133 B1 * | 1/2006 | Rodomista | ............ | G06F 3/016 345/156 |
| 7,762,156 B2 * | 7/2010 | Chang | ................... | B25J 9/104 74/490.04 |
| 7,798,035 B2 * | 9/2010 | Duval | ................... | B25J 19/0016 74/490.01 |
| 8,004,228 B2 * | 8/2011 | Somes | ................... | B25J 9/104 318/568.11 |
| 8,380,351 B2 * | 2/2013 | Okuda | ................... | B25J 9/102 700/255 |
| 8,434,384 B2 | 5/2013 | Kang et al. | | |
| 8,621,954 B1 * | 1/2014 | Dellon | ................... | 74/490.01 |
| 2006/0117897 A1 * | 6/2006 | Grebenstein | ............ | B25J 9/104 74/490.05 |
| 2006/0207377 A1 * | 9/2006 | Gosselin | ................ | B25J 9/1065 74/490.01 |
| 2008/0229862 A1 * | 9/2008 | Nakamoto | ............ | B25J 9/1045 74/490.04 |
| 2010/0243344 A1 * | 9/2010 | Wyrobek | ................ | B25J 5/007 180/21 |
| 2011/0126651 A1 * | 6/2011 | Pan | ........................ | B25J 9/102 74/89.2 |
| 2012/0061155 A1 * | 3/2012 | Berger | ................... | B25J 5/007 180/21 |
| 2012/0067150 A1 * | 3/2012 | Zhang | ................... | B25J 9/102 74/423 |
| 2012/0291582 A1 * | 11/2012 | Kang | ................... | B25J 19/0016 74/490.03 |
| 2013/0090194 A1 * | 4/2013 | Ferlay | ................... | B25J 9/104 474/64 |
| 2013/0304084 A1 * | 11/2013 | Beira | ................ | A61B 19/2203 606/130 |
| 2014/0248110 A1 * | 9/2014 | Kfoury | ................ | B25J 9/1065 414/680 |
| 2015/0001269 A1 * | 1/2015 | Sacksteder | ............ | F16M 13/04 224/576 |

* cited by examiner

GRAVITY-COUNTERBALANCED ROBOT ARM

BACKGROUND

1. Field of the Description

The present description relates, in general, to robots (e.g., humanoid or anthropomorphic robots) and design of arms for such robots, and, more particularly, to a robot arm that is designed to be passively safe through the use of counterweights to provide gravity-based counterbalancing.

2. Relevant Background

Robots are increasingly used outside the factory setting such as in surgery, patient therapy, home service, entertainment, and many other settings and applications. Often, it is desirable for these robots to be humanoid or anthropomorphic, and this may involve including two arms, with each being attached to a body via a shoulder and having human-like movements or a similar range-of-motion as a human arm.

A robot that has direct contact with humans must be designed to meet high safety standards. However, to be useful as a humanoid robot, the robot also should be designed, physically and functionally, to be compatible with the speed, dexterity, and range-of-motion of its human counterpart. For example, the robot's arms should be designed to move in a manner that matches the human arm. This need may be self-evident for rehabilitation, exoskeleton, and entertainment character-simulating robots (or animatronics), but anthropomorphic configurations of robots are also being used more and more frequently in factory or industrial settings. Often, to meet safety needs, it is desirable to design and use robots that are "passively safe." This means that the robot's actuators are physically incapable of moving the arms in any way that can cause injury to a human. In this regard, maximum limb speed can be set by limb inertia, surface compliance, geometry, and the pressure and impulse limits specified by one or more relevant safety standards.

Excepting high-speed robot arms, gravity loads frequently dominate actuator torque budgets. For a passively safe design, overcoming gravity may consume all available torque, which limits the arm to low-speed operations. Gravity counterbalancing using either counterweights or springs can be used to allow the motors to be sized to the dynamic loads, allowing for smaller motors and reduced resting power consumption. This can be a desirable benefit for mobile applications.

Unfortunately, existing counterbalancing designs for robots including the robot arms has not proven wholly useful for anthropomorphic robots with desired arm movement. Counterweights often add significantly to arm mass when the counterweights are provided on or in the arm, and, hence, designers have generally moved away from the use of counterweights. In other cases, the counterweight is positioned on an extension element extending from the upper arm, but this arrangement is not useful for humanoid robots as the extension extends well beyond a typical human form factor and generally limits the range-of-motion. Other designs have utilized spring-based counterbalance systems, with the spring often also positioned within or on the arm. However, spring counterbalance systems are mechanically complex to implement, and the added components can actually result in no or only limited reductions in mass compared with existing counterweight designs.

SUMMARY

The present description teaches a robot with gravity counterbalancing in its anthropomorphic robot arms. Gravity compensation systems vary in performance, complexity, and added weight. Many prior designs are inappropriate for anthropomorphic arm configurations, and, in particular, many of these prior designs have undesirable shoulder singularities. In contrast, the robots taught herein have a design that provides the desired shoulder singularity.

Through a differential, both motors are grounded, which allows the motors and counterweights (or counterspring assemblies, when used in place of counterweights) to be located remote from the arm and the shoulder so as to provide better packaging and mass distribution within a robot incorporating the new design. Also, by reducing motor torque requirements through the use of a counterweight (or a counterspring assembly), a small gear ratio can be used in the robot, thereby allowing a backdrivable design appropriate for force-mediated interaction. The present design for a robot arm (or arm or shoulder assembly) uniquely combines the characteristics of a large range-of-motion for the arm, backdrivability, and remote actuation and counterbalancing (as the counterweights/springs and motors are positioned to be spaced apart from the arm/shoulder).

More particularly, an arm assembly or apparatus is described for use in a robot so as to provide gravity counterbalancing of each of the robot's arms. The arm assembly includes an arm link, with a predefined mass including the effective mass at any serially-connected arm links, and a drive assembly selectively operating to move the arm link through a range-of-motion. Further, the arm assembly includes a differential mechanism interconnecting the drive assembly with the arm link. The differential mechanism is attached to a torso-side or upper end of the arm link, and the differential is adapted to provide gravity counterbalancing for the predefined mass of the arm link, including the effective mass at any serially-connected arm links.

In some embodiments, the differential mechanism includes two pairs of bevel gears each including an input gear. Each of the input gears has a counterweight providing the gravity counterbalancing for the predefined mass of the arm link. The counterweights can each be configured to provide equal amounts of counter torque to balance gravity-based movement of the arm link. For example, the counterweights may have substantially equal weights and be equal distances from the rotation axis of the shoulder/differential. In some cases, each of the counterweights is linked to one of the input gears to rotate with the input gears about a rotation axis of the differential. The drive assembly may include a pair of motors independently rotating the input gears. In some cases, the motors can be spaced apart from the input gears, grounded to the robot chassis, and interconnected with the input gears via a pair of drive elements, whereby the motors are adapted for mounting within a torso of the robot a distance from the differential.

In other embodiments of the arm apparatus, the differential mechanism includes a cable differential including a first pair of capstans with a first diameter that are interconnected with a first cable (or cord) and a second pair of capstans with a second diameter that are interconnected with a second cable (or cord). In such embodiments, an input one of the first pair of capstans and an input one of the second pair of capstans are driven by the drive assembly, the drive assembly including a pair of pulleys spaced apart a distance from the differential that are independently rotated by a pair of motors. Each of the pulleys of the drive assembly may have a counterweight providing the gravity counterbalancing for the predefined mass of the arm link, including the effective mass at any serially-connected arm links. In such cases, the counterweights each can be configured to provide equal amounts of counter torque to balance gravity-based movement of the arm link. Particularly, the counterweights may have substantially equal weights (and be located equal distances from the rotation axis of the differential mechanism or the shoulder).

In either of these implementations of the differential mechanism, it is desirable for the range-of-motion of the arm link to be unrestricted by the differential or the drive assembly, for the drive assembly to be backdrivable, and for two (of the three) degrees of freedom (DOF) of the arm link to be grounded.

DETAILED DESCRIPTION OF THE PREFERRED EMBODIMENTS

In general, a robot, with one or two arms such as a humanoid robot with a pair of anthropomorphic arms, is designed so as to be powerful enough to be able to lift its own arms up against gravity unless a counterbalance is used. Further, for high speed robots including audio-animatronic robots, gravity loads are only a small part of the total force needed to lift a robot arm. However, when building robots that can directly touch and interact with humans, the robots including their arms are designed to move more slowly to provide acceptable levels of safety. In such cases, the gravity loads can be equal to, or exceed, the loads to accelerate and move the arm. It is possible that in order to make the motors large enough to lift the robot arm against gravity these motors could also be powerful enough to move the arms at dangerous speeds.

A counterbalance can be used to address this problem by removing the requirement that the motor has to fight or overcome gravity. The motors can then be chosen to only be large enough to accelerate the arm up to a predefined maximum safe speed for the particular robot and its intended uses. Traditional methods of counterbalancing robot arms, though, have been either bulky or undesirably reduced the range-of-motion of the robot arm. The following description presents a new design for a robot arm that is configured to completely balance the arm while introducing no restriction on the range-of-motion. The configuration of this new robot arm also more closely matches that of a human than prior or traditional counterbalanced robot arms. Further, there is an added benefit that the included counterweights or counter balance springs (i.e., elements included to provide gravity counterbalancing in the robot arm) can be placed inside the robot's torso, e.g., close to the pelvis, and such placement facilitates a more favorable overall mass distribution, which makes balancing the robot easier and the structure of the robot much lighter.

In some cases, the new design for a robot with an arm includes a shoulder that uses a differential mechanism, which may be similar to differentials used in automotives, to connect the arm to the motors and counterweights. This is in contrast to a design that may attach these two components directly to the arm. Also, the robot may, instead of using a single counterweight moving in two angles and directly attached to the arm, use a differential-based design that uses two half-counterweights. Each of these half-counterweights may then each move in a single angle. Further, these two counterweights can be positioned completely within the body of the robot and may also be separated from the shoulder (e.g., be located at a spaced apart location such as near the robot's pelvis).

Prior to turning to specific aspects of the new robot design with its improved arm assembly, it may be useful to discuss prior designs and attempts at providing a solution to the robot arm design problem. One relatively simple approach was to add an extension to the upper arm (e.g., extend the upper arm past the shoulder joint) and then attach a counterweight. However, this is a bulky arm assembly design and it can be unsightly. Further, the extension interferes with the body during motion of the arm.

Many other arm assemblies have used springs to address this problem because a spring can support the arm, and it contributes less additional mass to the robot. However, when one considers the added complexity and extra components required to use springs, the use of springs may not actually provide much or any overall mass savings. One arm design that uses springs positions the spring inside the arm, which is similar to how a "steady-cam" mount for a motion picture camera works. Another example is the WREX arm (or Wilmington Robotic EXoskeleton arm) that was designed to assist people with neuromuscular degeneration that could not lift up their arms. The WREX arm supports their arm with an exoskeleton mechanism that allows them to use their limited strength to move their arm around without having to fight gravity. This method of spring-based counterbalancing is primarily used to balance the forearm, though there have been examples of arm designs using springs inside the arm to balance the upper arm. Other spring-based arm designs require the upper arm to be "singular" or in "gimbal lock" when hanging straight down, which is an acceptable design for an industrial robot that is always reaching out (hanging the arm down is not required or useful) but is a very poor choice for a humanoid robot where the arm should hang down a significant amount of the time to simulate human arm movement or at rest positions.

Interference between the upper arm spring and its connection to the body of the robot also reduces the range-of-motion of the robot arm. Again, some designs attempting to resolve the range-of-motion issue have been generated, but these designs failed to also solve the shoulder singularity problem. Hence, these designs are not appropriate for use in a human-like or human-assistive robot. Other designs have used hydraulics to remove the counterweight from the arm, but these designs were not wholly desirable because they had restricted range-of-motion and other operating issues.

As will become readily apparent from the following description, the inventor's robot arm design (or robot with a counterbalanced arm or arm assembly) provides a number of useful and significant advantages over these prior arm designs. One advantage of the robot arm design is a counterweight system that allows a large, unobstructed range-of-motion that actually exceeds a normal human range. There is no interference between the counterbalance or counterweight system and the robot body or arm. The shoulder singularity also better matches normal human motion. Further, counterweights (or counterbalance springs when used) and their associated or paired motors can be placed outside of the arm such as low within the body for better mass distribution. When counterweights are used, some robot embodiments may be designed to provide perfect, rather than approximate, balancing of the arm against gravity (e.g., arm remains in place if the motor is stopped in any arm position). None of the prior designs for arms is able to combine all of these desirable attributes into one design.

Figure 1A:
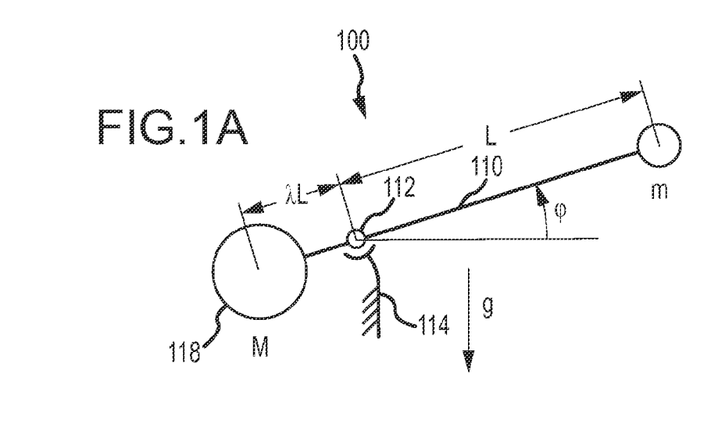
FIGS. 1A-1C illustrate three robot arm assemblies designed to provide mass-based and spring-based gravity compensation for one-link and two-link robot arms.

Further, prior to describing the inventor's specific embodiments for a robot arm or shoulder assembly, it may be useful to more generally discuss gravity counterbalancing and techniques for achieving such an arrangement for a robot arm. The advantages of counterbalancing a robot arm are evident from a simple dimensional analysis. One can consider an arm assembly 100 as shown in FIG. 1A with a single-link robot arm 110 of length, L, with constant cross-sectional area, A, and uniform density, $\rho$. The arm 110 is shown to be balanced about a shoulder (or shoulder joint) 112 on support 114 with single counterweight 118. When outstretched horizontally, the static moment due to gravity is maximal as shown by the following equation:

$$(\tau_{stat})_{max} = (\rho A L) g \frac{L}{2} \qquad \text{Eq. (1)}$$

Dynamic torque is highest at maximum acceleration, $(\tau_{dyn})_{max} = I \ddot{\phi}_{max}$, where I is the mass moment of inertia, $$I = \frac{1}{3}(\rho A L) L^2,$$

and $\ddot{\phi}_{max}$ is the peak angular acceleration. Assuming point-to-point motion with a sinusoidal velocity profile, the acceleration is given by:

$$\ddot{\phi} = \omega^2 \Phi \sin(\omega t) \qquad \text{Eq. (2)}$$

where $\omega$ is the angular frequency, given by $\omega = \dot{\phi}_{max}/\Phi$, where $\Phi$ is the angle moved, and $\dot{\phi}_{max}$ is the peak angular velocity. Thus, one can find a peak angular acceleration, $\ddot{\phi}_{max} = \dot{\phi}_{max}^2/\Phi$, and the ratio between peak static and dynamic torque for the robot arm is given as:

$$\frac{(\tau_{stat})_{max}}{(\tau_{dyn})_{max}} = \frac{\frac{3}{2} g \Phi}{L \dot{\phi}_{max}^2} \qquad \text{Eq. (3)}$$

One can now consider an arm 60 centimeters long that rotates through 180 degrees and that reaches a peak velocity of 60 revolutions per minute (RPMs) or one revolution per second. According to Eq. (3), peak static torques are then 1.9 times larger than dynamic torques. Slower peak velocities or shorter arms lead to even higher static loads. One can consider as well the thermal nature of electric motors. Without counterbalancing, the motors must be sized based on their continuous, rather than instantaneous, torque rating. To maintain safety, motor torque should be electronically limited at the amplifier to prevent the motor from applying torques above its continuous rating. With counterbalancing, the lower duty cycle of high-speed motion in many cases will allow the motors to be sized by their instantaneous torque rating, thereby reducing motor mass in the robot by a factor of two or more.

FIG. 1A illustrates the simplest possible counterbalance design with assembly 100 for a single link robot arm 110 with a lumped mass, m, and a length, L. A single counterweight 118 with mass $M = m/\lambda$ balances the arm 110 for three degree-of-freedom (DOF) angular motion about the shoulder 112, where $\lambda$ is the counterbalance moment arm as a fraction of L. To make the arm compact and prevent interference with the body (not shown in FIG. 1A), it is desirable to have a small $\lambda$, e.g., $\lambda \leq 0.2$, but this will increase the mass of the arm assembly 100 by a factor of six or more. Fortunately, total inertia scales as $I/(mL^2) = 1 + \lambda$, so that compact counterbalance configurations increase rotational inertia only slightly.

Figure 1B:
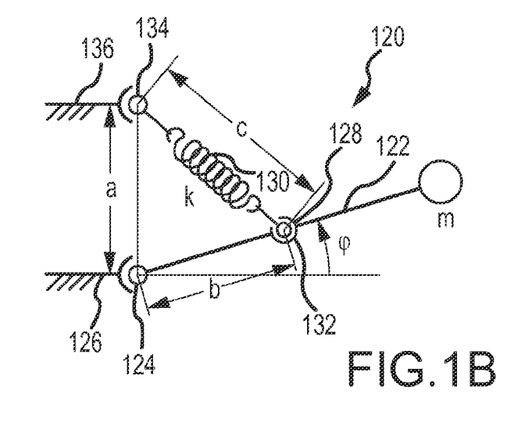

Springs are more mass efficient at storing potential energy; and FIG. 1B illustrates with arm assembly 120 an equivalent spring-based balancing method or design approach. The assembly 120 includes a single-link arm 122 pivoting about shoulder/end 124 on support 126, and a spring 130 that is pivotally attached via end 132 to the arm at arm connection 128 and pivotally attached at end 134 to an additional shoulder or body support element 136. As shown, the spring 130 is attached to the arm 122 at a distance, b, from the shoulder 124 and grounded at a height, a, directly above the shoulder 124. Via the Pythagorean theorem, one can obtain the length, c, of the spring 130 as a function of the arm's angle above horizontal, $\phi$, as follows:

$$c^2 = a^2 + b^2 - 2ab \sin \phi. \qquad \text{Eq. (4)}$$

One can then obtain the total potential energy of the mass, m, and spring 130:

$$U = mgL\sin\phi + \frac{1}{2}k(a^2 + b^2 - 2ab\sin\phi) \qquad \text{Eq. (5)}$$

where k is the spring constant and the spring is a so-called "zero free-length spring," i.e., it has a restoring force of $-kx$, where x is the absolute displacement/length of the spring 130. If:

$$mgL = kab \qquad \text{Eq. (6)}$$

Then, the potential energy is constant for any configuration of the arm 130. Springs can be made zero free-length, but only with some difficulty by winding them with a pre-stress. A zero free-length equivalent system can also be achieved with a normal spring, cable, and idler pulley as is known by those skilled in the art.

Figure 1C:
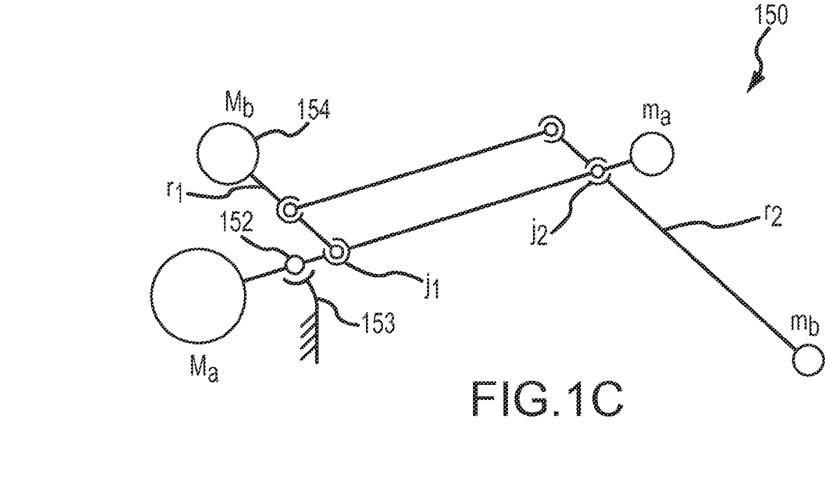

Balanced links can be serially connected, but arm mass rises exponentially with the number of links because each must balance the mass and counterweight mass of all downstream links FIG. 1C shows an arm assembly 150 that is useful for showing how a pantograph parallel mechanism can be employed to move the forearm counterweight 154 towards the shoulder 152 (pivoting on support 153). The orientation of forearm link, $r_2$, is reflected by a pantograph link, $r_1$. If joint, $j_1$, is moved to coincide with the shoulder center 152, then counterweights, $M_a$ and $M_b$, can be replaced with countersprings. Instead of coupling the forearm position back to the shoulder via pantograph, an alternative method is to bring a reference of the vertical orientation out to the elbow.

Figure 2A:
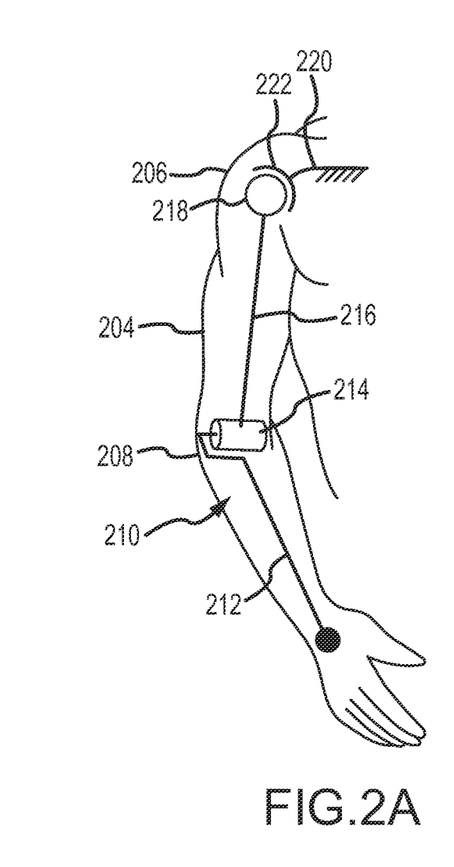
FIGS. 2A-2D illustrate, respectively, human arm kinematics approximated with a ball-and-socket arm assembly and three approximations to the human arm kinematics with the ball-and-socket joint replaced by a three joint assembly.
Figure 2B:
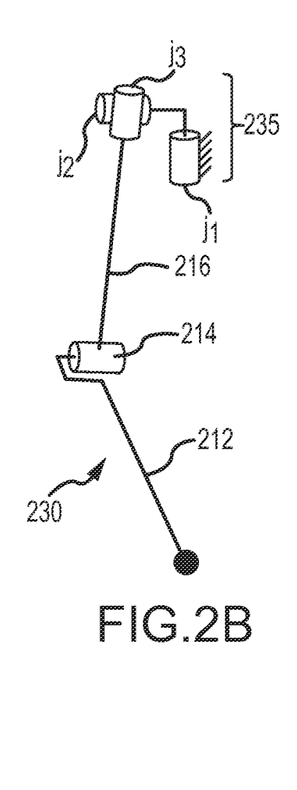
Figure 2C:
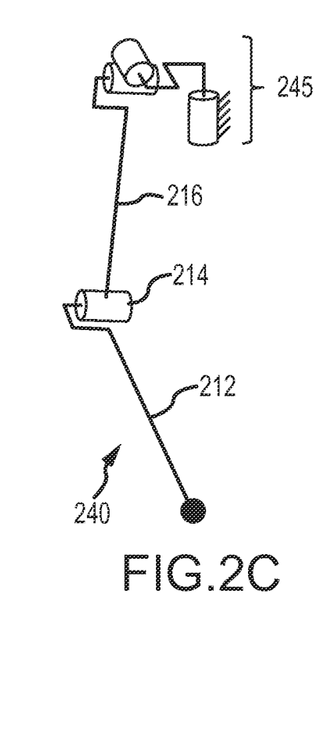

Neglecting scapular motion, human arm kinematics are well approximated by a ball-and-socket joint at the shoulder (singularity free) and a rotary joint at the elbow. This is illustrated in FIG. 2A with the arm 204 being replicated with an arm assembly 210 including a forearm link 212 and an upper arm link 216 connected with rotary joint 214 in the elbow 208. The assembly 210 further includes a ball 218 at the upper end of arm link 216 in a socket 222 of support element 220 (with ball 218 and socket 222 in the human shoulder 206). FIGS. 2B-2C provide three arm assemblies 230, 240, 250 that replace the ball-and-socket joint of assembly 210 with three different 3-joint assemblies 235, 245, and 255. As shown in FIG. 2B, starting from ground, the RRR shoulder joints are labeled serially as $j_1$, $j_2$, and $j_3$.

With regard to shoulder configurations, it can be seen in FIG. 2A that the human arm 204 includes a ball-joint shoulder 206, with 3 DOFs, and a revolute joint elbow 208. A ball joint is difficult to implement in a robot arm in most cases, and, as a result, an RRR configuration is commonly used to approximate the ball joint provided by ball 218 and socket 222 of FIG. 2A. The assembly 230 of FIG. 2B is used in many industrial robots and in a number of quasi-anthropomorphic service robots. One convenience of this configuration is that the grounded shoulder joint, $j_1$, is aligned with the direction of gravity, and a counterbalance spring can be connected between joints $j_1$ and $j_3$. This "flying" spring stays in a fixed plane that rotates with joint $j_1$ and, therefore, does not need universal joint connections at either end. However, this configuration is singular when the upper arm hangs straight down, which is undesirable as this is a very common pose for a human.

The arm assembly 240 of FIG. 2C removes this unfavorable singularity or gimbal lock, but, now, a counterbalance spring must be attached to the upper arm with a universal joint. In this configuration, when the second joint "abducts" to 90 degrees, the shoulder becomes singular for upper arm rotations, which lacks a dedicated joint. The arm assembly 250 of FIG. 2D, where joint $j_1$ points laterally, is very common for humanoid robots designed to mimic human motion (e.g., may be considered a preferred arrangement for replicating the ball and socket joint of the human shoulder, and the inventor's arm assembly design allows this arrangement to be more successfully utilized).

Figure 2D:
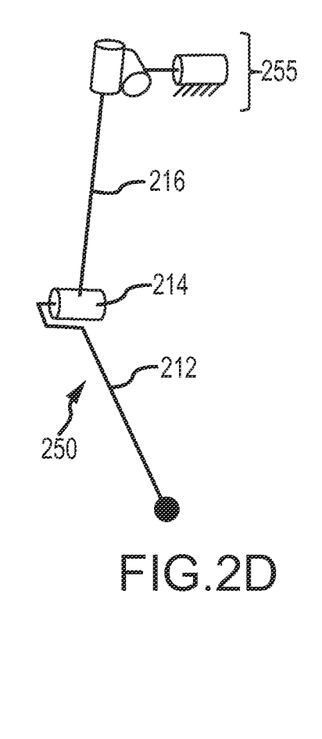

The upper arm is singular when aligned with joint $j_1$. Variants of this configuration align joint j1 slightly upwards and/or to the rear to optimize range-of-motion for a particular application. A favorable aspect of this configuration is that when the upper arm is singular, twisting of the robot torso about the vertical axis will provide redundancy for the shoulder. However, in this configuration, a spring counterbalance for the upper arm would require universal joints at either end, which makes the mechanical design relatively complicated.

For all configurations, there is a constant struggle to package the counterweights or counterspring assemblies compactly. A counterweight mounted directly to the upper arm interferes severely with the torso during abduction. With spring-based methods, interference between the arm and the spring ground connection also reduces the range-of-motion.

Figure 3A:
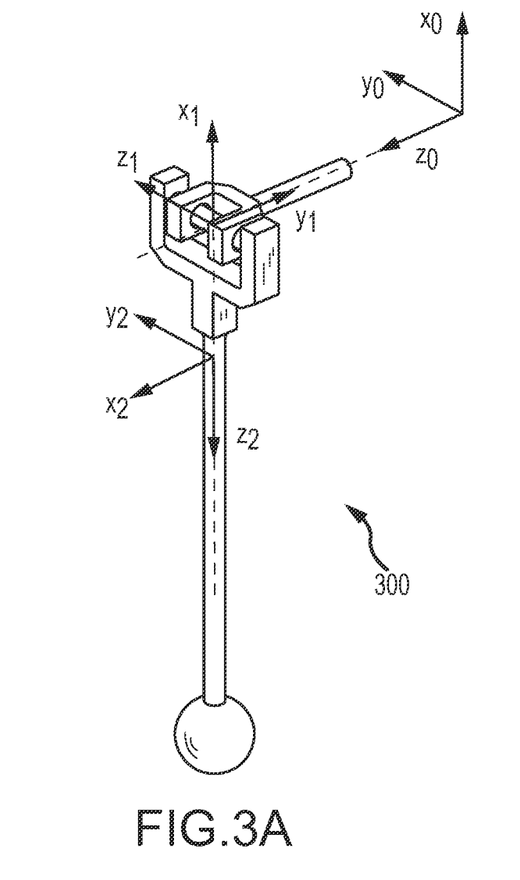
FIGS. 3A and 3B provide, respectively, coordinate frames in a reference position with the upper arm hanging down and coordinate frames with rotations for superimposed flexion and abduction.
Figure 3B:
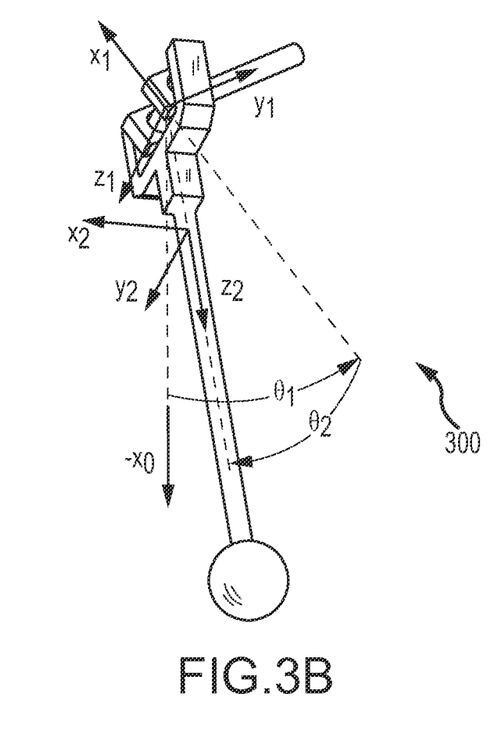

FIGS. 3A and 3B show with arm assembly 300 the basic mechanics of joints $j_1$ and $j_2$ for the configuration or arm assembly 250 of FIG. 2D. Coordinate frame $C_0$ is grounded, coordinate frame $C_1$ rotates with angle $\theta_1$ about the $z_0$-axis during arm flexion, and $C_2$ is attached to the upper arm (before the arm rotation joint, $j_3$) undergoing flexion and abduction. The gravity torques may first be calculated in the $C_0$ frame. Where $R_i^j$ is the rotation matrix from the $C_i$ to $C_j$ frame, the location of the center of mass, m, as measured in $C_0$ is given by $r_m^0 = R_1^0 R_2^1 r_m^2$. The rotation matrices are calculated from the unit vectors, $R_i^j = e_a^i e_a^j$; following FIGS. 3A and 3B, one can arrive at:

$$r_m^0 = \begin{bmatrix} \cos\theta_1\sin\theta_2 & -\sin\theta_1 & -\cos\theta_1\cos\theta_2 \\ \sin\theta_1\sin\theta_2 & \cos\theta_1 & -\sin\theta_1\cos\theta_2 \\ \cos\theta_2 & 0 & \sin\theta_2 \end{bmatrix} r_m^2 \qquad \text{Eq. (7)}$$

The center of mass of the upper arm is located a distance, L, from the shoulder, $r_m^2 = Lz_2$. The vertical component of the center of mass in the rest frame is thus:

$$(r_m^0)_x = -L\cos\theta_1\cos\theta_2 \qquad \text{Eq. (8)}$$

To balance the arm, a counterbalance system is needed with a potential energy that varies as $\cos\theta_1\cos\theta_2$. A counterweight extending from the upper arm, as in FIG. 1A, satisfies this requirement trivially. Eq. (8) can then be expanded using the product-to-sum identity:

$$\cos\theta_1\cos\theta_2 = \frac{1}{2}[\cos(\theta_1 + \theta_2) + \cos(\theta_1 - \theta_2)] \qquad \text{Eq. (9)}$$

Notice that this has the form of a mechanical differential.

Figure 4A:
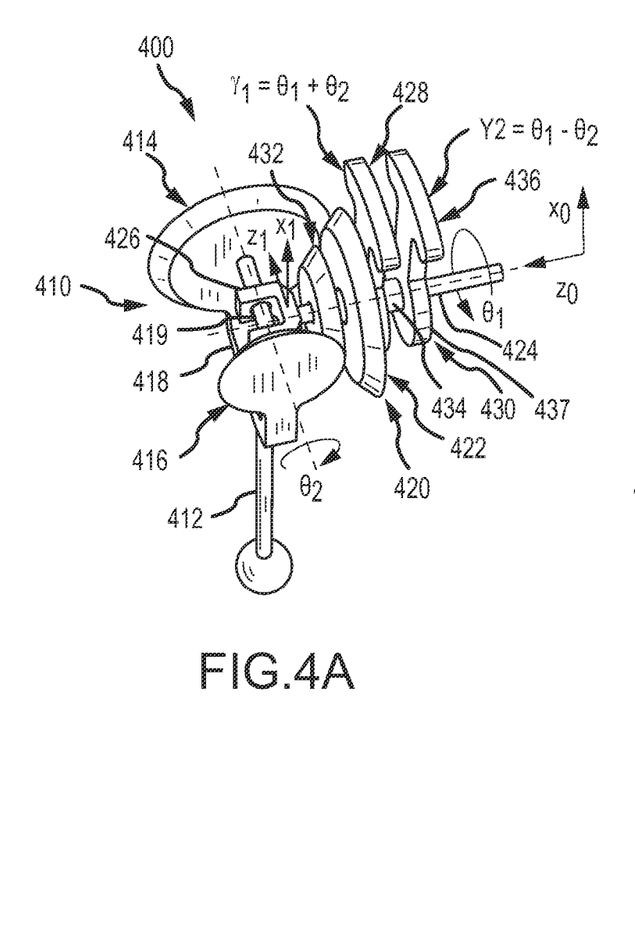
FIGS. 4A-4C illustrate an arm (or shoulder) assembly for a robot that is perfectly balanced in any movement through the use of a differential arrangement of gears along with a pair of counterweights, with FIG. 4B showing the assembly in pure flexion and FIG. 4C showing the assembly in pure abduction.
Figure 4B:
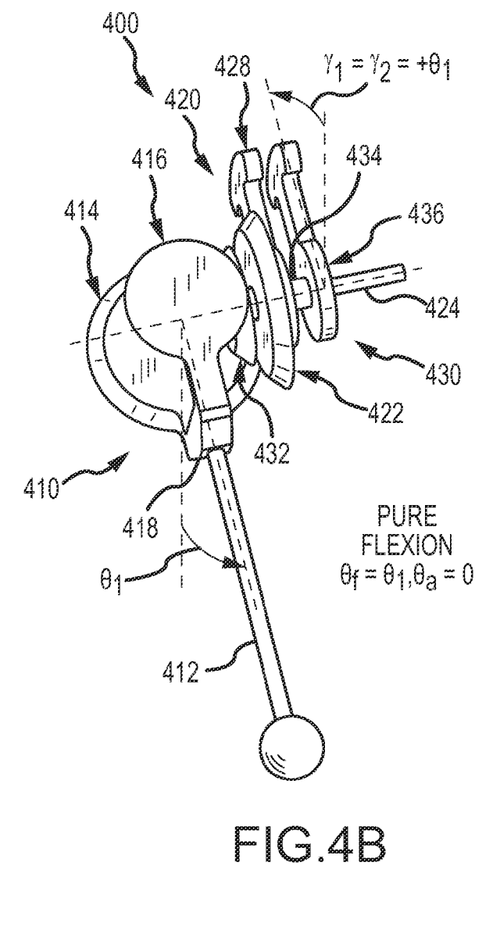
Figure 4C:
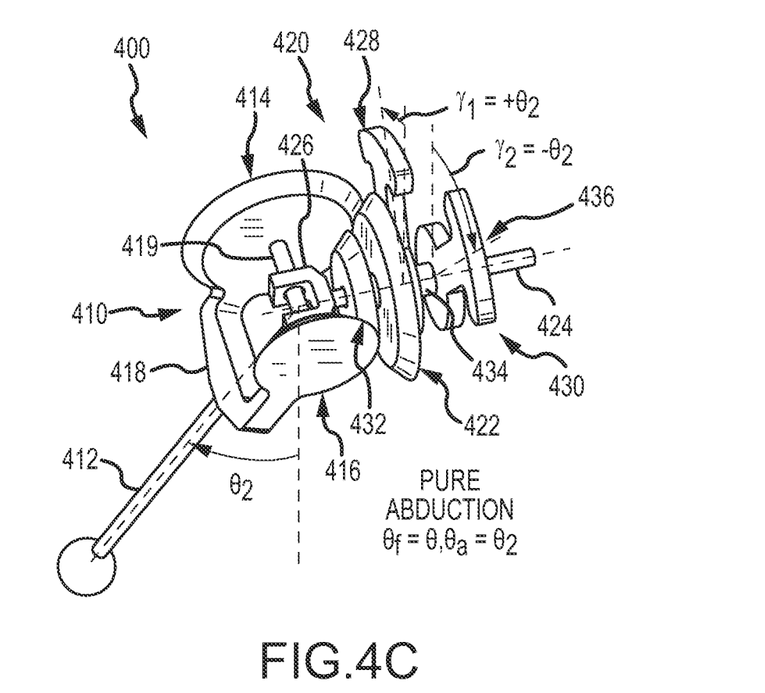

Consider now the configuration shown in FIGS. 4A-4C with robot arm (or shoulder) assembly 400, with FIGS. 4B and 4C showing the assembly in pure flexion and pure abduction, respectively. The arm assembly 400 includes a first gear assembly 410 with an upper arm/link 412, a first bevel gear 414 (with teeth not shown for simplification of the drawing), and a second bevel gear 416 spaced apart from the first bevel gear 414 but parallel (e.g., defining a U-shape in this case). The gears 414, 416 are interconnected via rotation shaft/pin 419 extending between the gears 414, 416 along their center rotation axis and are further interconnected by arm support element 418 to which an upper/inner end of the arm 412 is attached to move with the gears 414, 416 in the robot's shoulder.

The arm assembly 400 further includes a second gear assembly 420 including a bevel gear 422 engaging the bevel gear 414 of the first gear assembly 410. The bevel gear 422 is pivotally supported upon a rotation shaft/pin 424 extending through its center rotation axis into the space between the two gears 414, 416 of the first gear assembly 410 where the shaft 424 is affixed to yoke or U-shaped element 426, which is pivotally mounted to rotation shaft 419 of first gear assembly 410. The second gear assembly 420 further includes a counterweight 428 that is rigidly affixed to the bevel gear 422.

The arm assembly 400 also includes a third gear assembly 430 with a bevel gear 432 mated with bevel gear 416 of the first gear assembly 410. The gear 432 is pivotally supported upon the rotation shaft 424 via hollow tube 434. Further, a counterweight 436 is provided in the third gear assembly 430 and is affixed to the hollow tube 434, too, so as to rotate with the bevel gear 432 during operation of the robot's arm (or shoulder) assembly 400 to move the arm 412. As shown, a differential (with two pairs of two differing diameter gears) is provided that is used to couple torques proportional to $(\theta_1 + \theta_2)$ and $(\theta_1 - \theta_2)$ to counterbalance the arm 412. For clarity, the differential is represented with bevel gears (teeth not shown) but right angle or other gears may be used. The two inputs of the differential are provided by the gear 422 of the second gear assembly 420 and the gear 432 of the third gear assembly 430, and the sense of flexion and abduction imply a frontal view of a right shoulder of an anthropomorphic robot.

The arm assembly 400 is configured to provide a differential or differential mechanism that in this example is provided by the two pairs of bevel gears 414/422 and 416/432 in a one-sided cantilever configuration (but could be provided as a balanced configuration in some cases). The illustrated configuration of arm assembly 400 with its differential design allows for continuous 360-degree flexion of the arm 412 without interfering with the ground connection. In the rest position, counterbalance masses $M_1$ and $M_2$ (provided by counterweights 428, 436) stick up, at heights $\lambda_1 L$ and $\lambda_2 L$. The total potential energy of this system is $$U = -mgL \cos\theta_1 \cos\theta_2 + M_1 g\lambda_1 L \cos(\theta_1+\theta_2) + M_2 g\lambda_2 L \cos(\theta_1-\theta_2)$$

If we fix $$M_1 L\lambda_1 = M_2 L\lambda_2 = \frac{1}{2}mL \qquad \text{Eq. (10)}$$

Then, one can find U=0 for all configurations, balancing the arm. A single counterweight has been split into the two counterweights 428, 436, with each balancing half the arm's weight. During flexion as shown in FIG. 4B, the counterweights 428, 436 move in-phase, as if they were an extension of the arm. During abduction as shown in FIG. 4C, the counterweights 428, 436 move symmetrically out-of-phase, with the net center of mass dropping as the arm's center of mass rises.

A connecting hub 434 allows the counterweights 428, 436 to rotate continuously without interference. Motors and counterbalances, which may be used in a robot incorporating the arm assembly 400, may be placed low in the torso and connected to the differential inputs (bevel gears 422, 432) by timing belts. Counterweight 436 is attached to a pulley 437. Since pulley/gear 432 is "trapped," tube 434 is used to connect to another pulley (i.e., pulley 437), which is not "trapped." The counterweights 428, 436 may be replaced with springs such as according to FIG. 1B. Even though the mass of the arm assembly 400 will increase by a factor of $(1+1/\lambda)$ when using a counterweight, much of this increase can be placed near the robot's pelvis.

Note, the center of mass of the balanced system never moves in the $y_0$-direction. This means that arm swing cannot be used to balance a walking robot in the sagittal plane. However, abduction of the arm does shift the center of mass laterally along the $z_0$-axis, proportional to $\sin(\theta_2)$, and this should be accounted for in the overall balancing of the robot.

Figure 5:
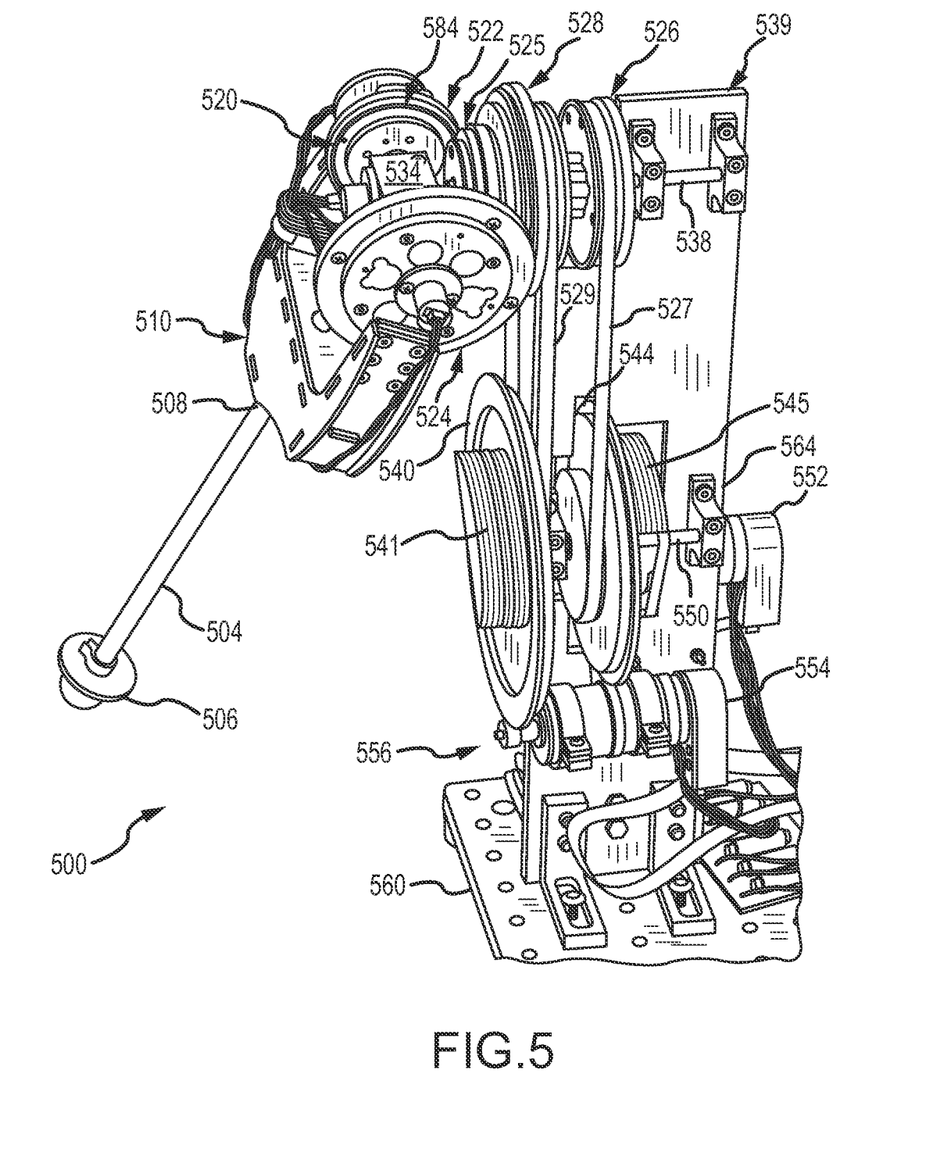
FIG. 5 is a side perspective view an exemplary robot arm assembly showing one technique for using counterweights to counterbalance a robot arm by placing counterweights within the torso (outside/away from the shoulder of the robot)
Figure 6:
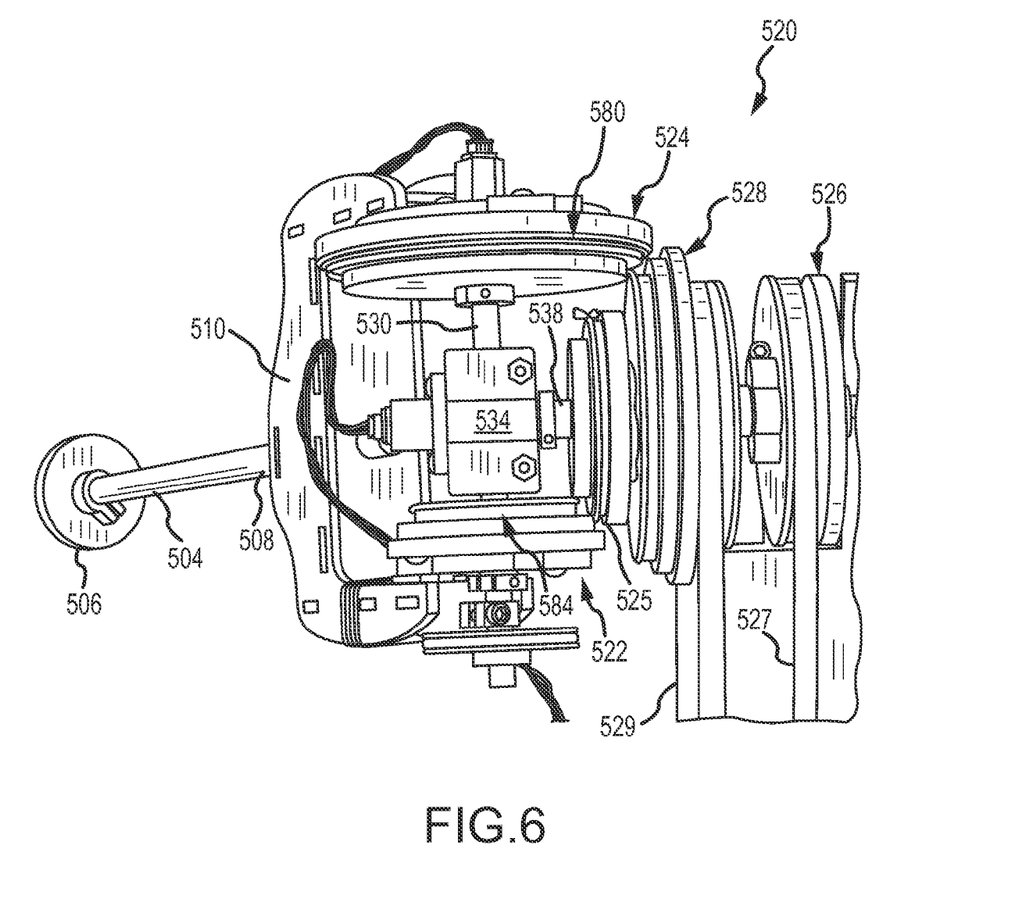
FIG. 6 illustrates an enlarged top view of a portion of the arm assembly of FIG. 5 showing details of the differential mechanism.

To explore this counterbalance design further, the inventor designed and built a prototype robot arm assembly 500 as shown in FIGS. 5 and 6 (with FIG. 6 showing an enlarged or more detailed view of the components of the differential 520). As shown, the arm assembly 500 includes a single arm link (or upper arm) 504 with a weight or mass 506 on its end (e.g., to simulate added weights of a forearm or the like). An inner end 508 of the arm 504 is connected to arm attachment element or yoke 510.

The arm assembly 500 further includes a differential 520 in the form of a cable differential in this prototype. The differential 520 includes a first capstan 522 (with a first diameter) and a spaced apart second capstan 524 (with a second, larger diameter). These capstans 522 and 524 are interconnected with shaft or pin 530, which extends along the center rotation axes of the capstans 522, 524 and also with the arm attachment yoke 510 (such that the arm 504 moves with movement of either of the capstans 522, 524).

The differential 520 further includes a third capstan/pulley 526. The third capstan/pulley 526 is supported by shaft 538, which is mounted to the support 539 (e.g., a ground or frame portion of a robot provided near the robot's shoulder). A fourth capstan 525 with the same diameter as first capstan 522 is also supported by the shaft 538, and this capstan 525 is mated or paired with the capstan 522 via cord 584 to drive this capstan 522 during arm assembly 500 operations. Capstans 525 and 526 may be rigidly connected by a tube as discussed above with this tube being on bearings so as to spin around fixed shaft 538. A ball bearing or other bearing element 534 is provided at the union of the shafts 530, 538 between the three capstans 522, 524, 525. The differential 520 further includes a fifth capstan 528 pivotally supported on shaft 538 and mated or paired with the capstan 524. The capstans 524, 528 have the same diameter and the capstan 524 is driven by the rotation/movement of the input capstan 528 via cord 580.

In contrast to assembly 400, the arm assembly 500 is configured to have both the counterweights and the drive motors spaced apart from the shoulder so as to allow them to be mounted within the torso of a robot incorporating the arm assembly 500. To this end, the two input capstans 526, 528 are driven by timing belts or cables 527, 529 (shown as belts in FIGS. 5 and 6). The belts 527, 529 mate with capstans 526, 528 and also with pulleys/capstans 544, 540, respectively, which both rotate about shaft 550. The shaft 550 is fixed to support/frame element 564, which in turn is affixed to base 560, and these may be replaced, in actual implementations, with internal frame portions of a robot such as with base 560 being in or near the robot's pelvis. As shown, the rotation axis defined by the shaft 550 for the two pulleys/capstans 540, 544 is parallel to the rotation axis provided by shaft 538 and capstans 525, 526, and 528, and the two rotation axes are spaced apart a distance to place these weights/masses down within the robot's torso. This spacing or distance can vary to practice the assembly 500 and will vary with the size of the robot/arm assembly 500 but may be several inches to several feet with a spacing in the range of 6 to 36 inches being common for many anthropomorphic robots.

Pulley/capstan 544 is driven by input motor 552, and this results in turning of belt 527 and capstan 526. Pulley/capstan 540, which rotates independently from pulley 544, is driven by motor 554 which in this system 500 rotates the capstan 540 via a friction drive 556 (the other capstan is also friction driven (occluded from view)). In this way, both motors 552, 554, which often represent significant portions of the mass of an arm assembly such as assembly 500, are positioned in the torso away from the shoulder (e.g., the shoulder's rotation axis defined by shaft 538) such as near the robot's pelvis (not shown in FIGS. 5 and 6).

Significantly, the arm assembly 500 further includes a pair of counterweights 541 and 545 that are attached to (or interconnected with) the two pulleys 540, 544. These two counterweights may be equal in weight, and each provides about half the weight desired for counterbalancing the arm 504 and the weight element 506. In other embodiments, the two counterweights 541 and 545 may be of differing weights, but, in such cases, the counterweights would be provided at differing distances, too, from the rotation axis defined by the shaft 550.

As can be seen, in the assembly 500, the differential 520 is achieved with cable capstans rather than bevel gears. Stock bevel gears often come in very limited choices and are expensive and sometimes difficult to machine, which limits their use at least during prototyping. In addition to the advantages in efficiency and freedom from backlash, a cable differential such as differential 520 is quite easy to prototype. In the cable differential 520, all capstans run on pairs of pre-loaded oil-lubricated ball bearings for minimum friction (see element 534). The cable differential 520 may be constructed from stacked, laser-cut, acrylic parts (or a variety of other materials).

The inner step of the small capstans 522, 525 may be in the range of 20 to 80 or more millimeters in diameter (with 40 mm diameter used in one embodiment). The cables/cords 580, 584 used in the prototype of assembly 500 were formed of 1.5 mm braided nylon cord. The input pulleys 540, 544 attach to the motors 554, 552 and counterbalances 541, 545 below with timing belts (e.g., 2-mm pitch timing belts or the like). The output pulleys (arm-side) are split between their two capstan steps and a set-screw cable pre-tensioner may be used. No retaining groove was machined into the capstans (in the prototype) 522, 524, 525, and 528, with proper alignment and shimming the capstans do not touch and there is no tendency for the cables 580, 584 to slide off. Note, the use of the differential 520 allows the motors 552, 554 to be provided in parallel because without a differential one of the motors would have to be carried by the other (e.g., a serial mechanism or arrangement).

The counterweights 541, 545 are, as shown, not attached to the shoulder input gears/capstans directly, as was the case in the assembly 400 of FIGS. 4A-4C, but, instead, via a pair of 1:1 timing belts 527, 529. This addition allows both the motors 552, 554 and the counterweights 541, 545 to be placed low in the body (not shown) of the robot using assembly 500. In one prototype implementation, rubber-covered pinion wheels mounted to the motor shafts were used to engage the counterbalance wheel rims in a friction drive, providing 12.5:1 and 10:1 torque amplification, but, of course, this is just one exemplary implementation and those skilled in the art will readily understand extensions and substitutions for this particular teaching by the inventor. In this case, though, the pinions were elastically pre-loaded against the counterbalance wheel rims so they were insensitive to moderate runout.

Different diameter wheels were used only so that they could share the same shaft (shaft 550 in assembly 500), which facilitated compact packaging of the motors 552, 554 (which may be brushless motors fitted with optical incremental encoders, and output angles may also be measured at the shoulder such as with absolute Hall encoders (10-bit resolution) or the like) in the arm assembly 500. These transmission elements were efficient and backlash free, which reduced demands on the control system (not shown or discussed in detail as motor controllers and other controllers as understood by those in the robotics industry may be used to implement and selectively drive/control the robot arm assembly 500 (or arm assembly 400)).

Compact Hall-based absolute encoders can be attached to each shaft 538, 530 at the shoulder joint and each motor 552, 554, can be fitted with an optical encoder. The brushless motors 552, 554 can be driven with amplifiers (e.g., off-the-shelf amplifiers). In the prototype assembly 500, a Matlab xPC target computer was used to run a closed-loop force controller (e.g., at 1 kHz).

Because the arm assembly 500 uses counterweights 541, 545 instead of springs, it can be perfectly balanced over the entire range-of-motion rather easily. All joints in the robot can use pre-loaded ball bearings for minimum friction. Even though the motors 552, 554 can be implemented using low-friction brushless motors, their friction dominates the timing belts 527, 529 and cable differential 520 (when pre-tensioned appropriately). In testing of a prototype of assembly 500, perfect balancing was achieved and maintained even when the motors 552, 554 are removed from the robot. The testing was also useful for showing and/or verifying that the arm assembly had a full range-of-motion (without interference problems as prior robots did), was useful for safely interacting with humans, and was backdrivable (via human interaction or the like).

Figure 7A:
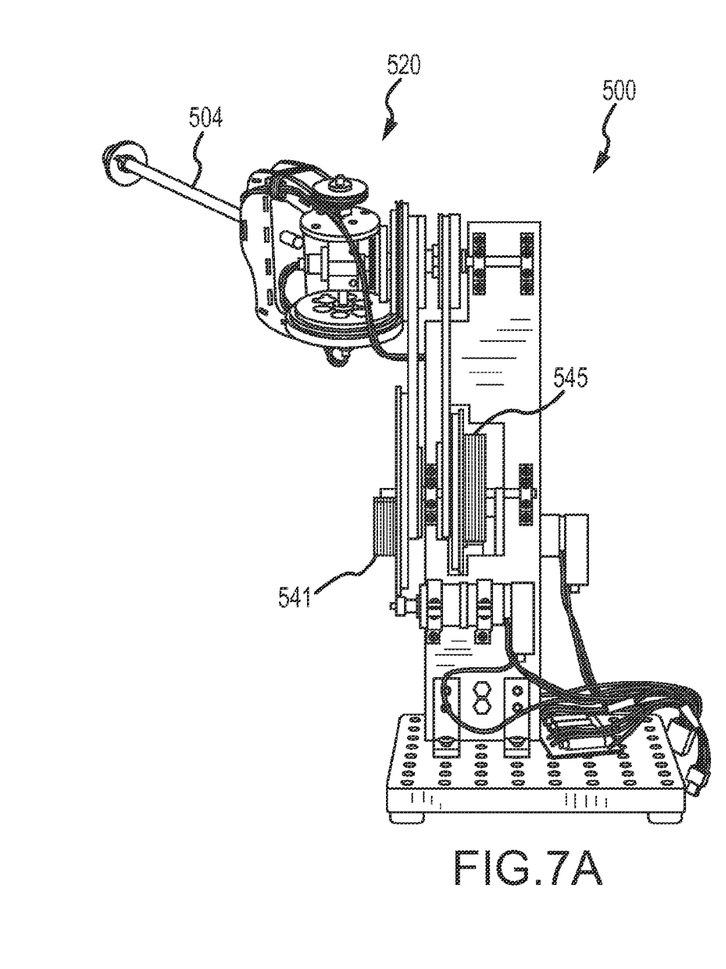
FIGS. 7A-7D illustrate the arm assembly of FIGS. 5 and 6 with the upper arm moved through or into a number of positions as the assembly and its differential mechanism are operated via drive motors.
Figure 7B:
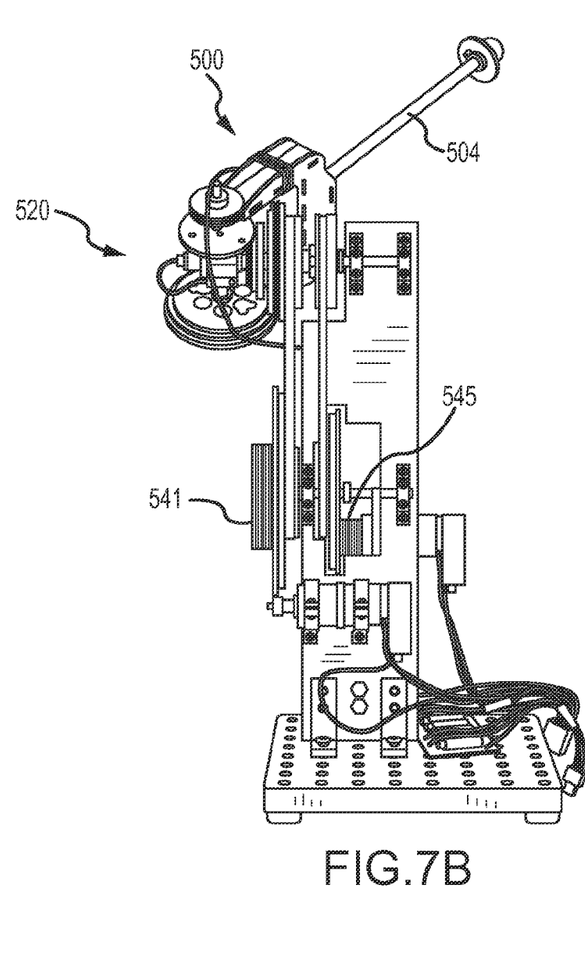
Figure 7C:
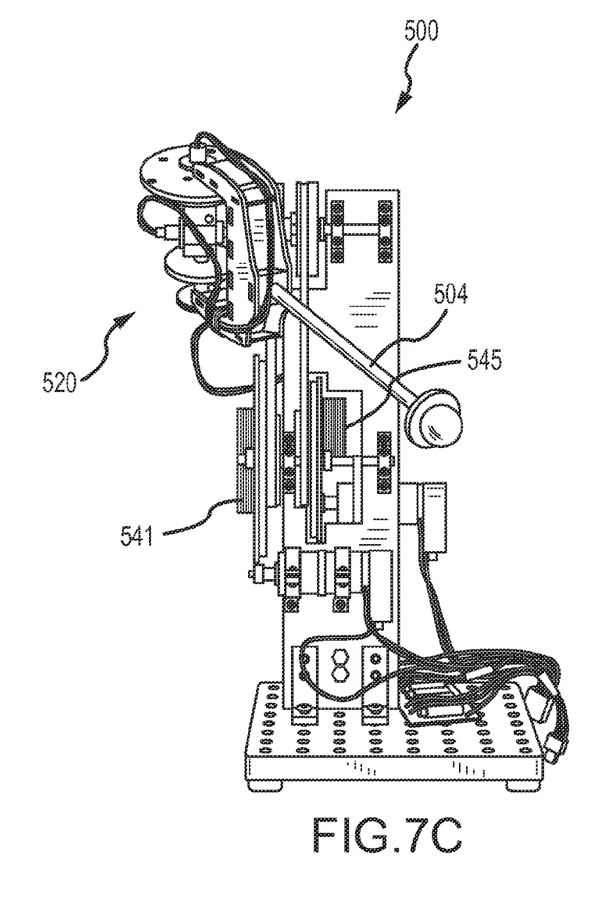
Figure 7D:
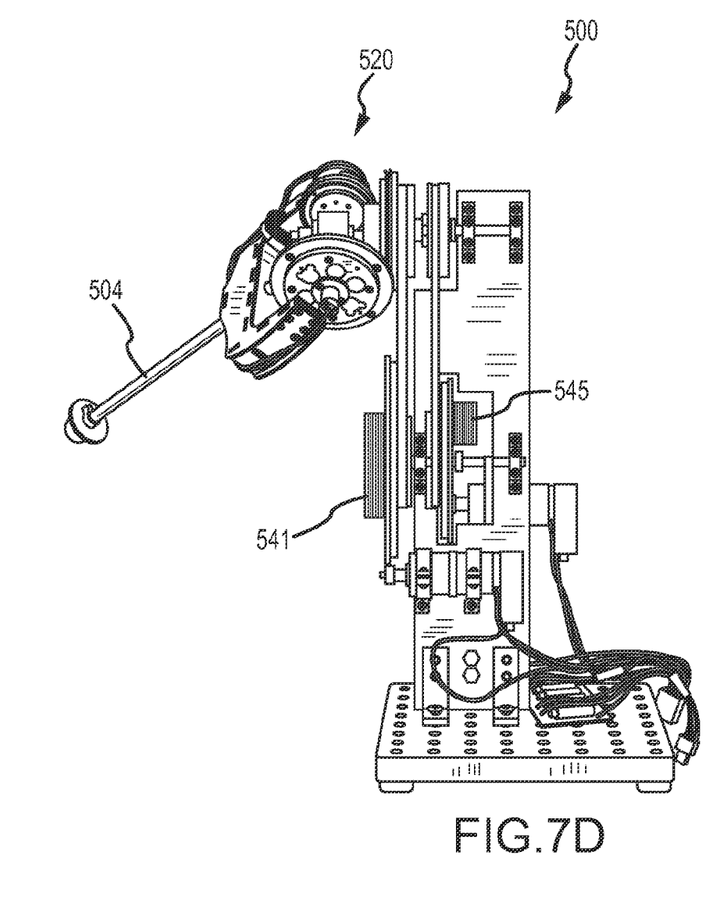

One primary advantage of the counterweight designs taught herein is the wide range-of-motion of the arm without interference between the counterbalance system and the robot body. FIGS. 7A-7D illustrate the arm assembly 500 of FIGS. 5 and 6 as it is moved through a range-of-motion of the upper arm 504. In FIG. 7B, the arm 504 is reaching back and medially, which actually exceeds the normal human range-of-motion of an arm. Interference when reaching across the body as seen in FIGS. 7B and 7C is determined by interference between the arm and either the timing belts or the large capstans.

As can be seen, FIGS. 7A-7D illustrate the range-of-motion that is possible with the arm assembly 500. Theoretically, the range-of-motion could be almost a full sphere, limited only by interference with the robot body. A cable transmission cannot operate more than 360 degrees, less an allowance for cable termination. The arm assembly 500 range-of-motion when prototyped exceeded nominal human range-of-motion, save the singularity. Rotating the shoulder about the vertical axis allows placement of the singularity farther to the rear without upsetting the counterbalance, but this is at the expense of a reduced range-of-motion when reaching across the body.

Applications for the arm assembly designs taught herein fall into a number of areas. One is robot arms that have to be passively and completely human safe but also lightweight and expressive in their movements. Entertainment and therapy robots are a natural fit for the arm assemblies of the present description. Another application of interest for the new arm assembly design is when a robot arm has to be absolutely counterbalanced for safety purposes and requires a large range-of-motion. For example, a robot performing a sensitive medical or surgical operation. To be both backdrivable and power-failure safe, the robot could be counterbalanced, and the design taught herein may be appropriate especially when a large range-of-motion is desired or required. Yet another potential application for the new arm assembly is in mobile robots where power consumption and range-of-motion are both critically important. Counterbalancing allows the motors to be sized for instantaneous torque ratings and static power consumption is eliminated without sacrificing backdrivability.

Arm rotation at the shoulder and elbow flexion should be considered when implementing the arm assemblies of this description. For example, to remotely actuate these joints, it may be useful to use fluid-based transmission. Alternatively, Bowden cables or the like could be employed or motors may be placed directly in the arm. To counterbalance the forearm, one may employ a simple pantograph such as that shown in FIG. 1C to move the forearm counterweight close to the shoulder to greatly reduce arm inertia.

In some embodiments, it may be useful for the main counterweights to be replaced with counterbalancing springs (as may be implemented in nearly any of the techniques known to those skilled in the art) such as zero free-length springs or cable-spring assemblies. This may be desirable to reduce torso weight further. Each spring, in such embodiments, may operate in one DOF only so as to simplify their mounting and integration in an arm assembly. Each input pulley typically has unrestricted 360-degree continuous rotation, which allows compact and interference-free mounting of counterbalance springs.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In brief and/or in review, when designing a robot for human safety during direct physical interaction, one approach had been to size the robot's actuators to be physically incapable of exerting damaging impulses, even during a controller failure. Merely lifting the arms of the robot against their own weight may consume the entire available torque budget, and this prevents the robot from having the rapid and expressive movement demanded of most anthropomorphic robots. To mitigate this problem, gravity counterbalancing of the arms had been a common tactic. However, most designs used prior to the inventor's design adopted a shoulder singularity configuration which, while favorable for simple counterbalance design, had a range-of-motion suited better for industrial robots than humanoid robots.

In this description, a robot or arm assembly design (or even shoulder design) is presented that uses a novel differential mechanism to counterbalance the arm while also preserving an anthropomorphically-favorable singularity configuration and natural (for humans) range-of-motion for the arm. Further, because the motors driving the shoulder are completely grounded, counterbalance masses (or springs) are easily placed or positioned a distance away (space apart) from the shoulder such as low in the torso (or near the pelvis of the robot). This mitigates any unfavorable impact on mass distribution and balance for the robot. A robot arm assembly using this design was constructed and evaluated for counterbalance efficacy, backdrivability, and performance under closed-loop force control, and the results indicated that the new design achieves a useful solution to the arm design problem while also providing a number of advantages over prior approaches.

It is desirable that as many of the motors as is practical are grounded, which generally refers to a fixed, common mechanical attachment point within a robot (e.g., bolt a motor onto a frame/support element). Grounding is desirable with regard to the drive motors because if these are not grounded other motors or components have to carry or have the burden of the load associated with the non-grounded parts. Use of a differential in the arm assemblies is desirable because it facilitates the use of two drive motors that are both grounded and that can operate in parallel to rotate or provide their input on two different axes of motion (2 degrees of freedom (DOFs) such as flexion/extension and abduction/adduction, which are the two pertinent DOFs for gravity balancing of an arm). This allows the motors to be placed within the body (e.g., in torso spaced apart from shoulder) rather than on the arm/limb of the robot.

The differentials are uniquely configured with counterweights (i.e., not simply using a differential but, instead, are using a counterweighted differential). Hence, the arm assembly can easily be perfectly counterbalanced (e.g., arm stays in place if the drive or input motor is stopped). Further, the counterweighted differential in contrast to many prior counterbalanced robot arms does not restrict movement of the counterbalanced arm. The embodiments taught herein typically used two "half" counterweights with each moving in 1 DOF. By "half," the inventor does not necessarily mean half the mass as the two half counterweights could be unequal in mass as long as arranged/positioned relative to the differential to give equal torques (e.g., could make one counterweight larger and place it closer to its axis of revolution). In other words, one embodiment may call for the two counterweights to have equal mass ($M_1=M_2$) and also to be equal distances from the rotation axis ($L_1=L_2$). In other cases, both of these parameters may differ as long as the counter torques provided by each counterweight to the differential are equal. Again, the counterweights may be replaced by springs or spring assemblies.

The counterweight-based arm assemblies provide a large unrestricted range-of-motion (like would be expected for a human shoulder joint). The assemblies may be used to implement humanoid shoulder joint configuration as shown in FIG. 2D. Using a differential in such assemblies allows two of the three shoulder DOFs to be grounded. The motors and/or the counterweights do not have to be at the shoulder but, instead, these can be spaced apart from the shoulder and its rotation axis such as in the robot's torso near the pelvis (note, prior to the inventor's design, robot designers avoided use of counterweights because of added weight near the shoulders). When two arm assemblies are provided in a humanoid robot, the left and right arms may be co-linear or the shoulder rotation axis/shaft could be tilted back to move the singularity point back a distance within the robot.

I claim:

1. An arm apparatus for use in a robot to provide gravity counterbalancing, comprising:
    an arm link with a predefined mass;
    a drive assembly selectively operating to move the arm link through a range-of-motion; and
    a differential mechanism interconnecting the drive assembly with the arm link,
    wherein the differential mechanism is directly attached to an end of the arm link whereby the end of the arm link moves in direct response to operation of the differential mechanism,
    wherein the differential mechanism is adapted to provide gravity counterbalancing for the predefined mass of the arm link,
    wherein the differential mechanism includes first and second input elements coupled to the end of the arm link, and
    wherein the differential mechanism includes a first counterweight, spaced apart from the first input element, providing gravity counterbalancing to the first input element and a second counterweight, spaced apart from the second input element, providing gravity counterbalancing to the second input element.

2. The arm apparatus of claim 1, wherein the predefined mass is the mass of the arm link combined with an effective mass of all serially-connected links downstream of the arm link.

3. The arm apparatus of claim 1, wherein the differential mechanism comprises a cable differential including a first pair of capstans with a first diameter and interconnected with a first cable and a second pair of capstans with a second diameter and interconnected with a second cable.

4. The arm apparatus of claim 3, wherein an input one of the first pair of capstans and an input one of the second pair of capstans are independently driven by the drive assembly, the drive assembly including a pair of pulleys spaced apart a distance from the differential that are independently rotated by a pair of motors.

5. The arm apparatus of claim 4, wherein each of the pulleys of the drive assembly has a counterweight providing the gravity counterbalancing for the predefined mass of the arm link.

6. The arm apparatus of claim 5, wherein the counterweights each are configured to provide equal amounts of counter torque to balance the arm link against gravity.

7. The arm apparatus of claim 6, wherein the counterweights have substantially equal weights.

8. The arm apparatus of claim 1, wherein the range-of-motion is unrestricted by the differential or the drive assembly, wherein the drive assembly is backdrivable, and wherein two degrees of freedom (DOF) of the arm link are grounded.

9. A robot arm assembly, comprising:
a differential mechanism with first and second inputs and first and second outputs;
an arm attached via an arm mounting element to the differential mechanism to move with the first and second outputs;
a first counterbalance connected to the first input to counterbalance gravity on the arm in a first degree of freedom (DOF);
a second counterbalance connected to the second input to counterbalance gravity on the arm in a second DOF;
a first motor spaced apart from the differential mechanism adapted for driving the first input; and
a second motor spaced apart from the differential mechanism adapted for driving the second input independently from operations of the first motor.

10. The robot arm assembly of claim 9, wherein the first and second counterbalances each comprise a counterweight and wherein the counterweights are of equal weight.

11. The robot arm assembly of claim 9, wherein the first counterbalance applies a first counter torque on the first input and the second counterbalance applies a second counter torque, which is equal to the first counter torque, on the second input.

12. The robot arm assembly of claim 9, wherein the first and second motors are grounded when the robot arm assembly is mounted in a robot.

13. A robot comprising:
a torso with a shoulder;
a differential mounted within the shoulder, wherein the differential includes two output elements and two input elements each interconnected with one of the output elements, whereby movement of one of the input elements causes corresponding movement in the interconnected output element;
an upper arm attached to the differential to move with movement of either of the output elements of the differential through a range-of-motion that is unrestricted by the differential;
first and second motors independently operating to move the two input elements; and
first and second counterbalances to apply equal counter torques, respectively, on the input elements of the differential,
wherein the upper arm is counterbalanced against gravity,
wherein the first and second motors each rotate a pulley, having a rotation axis parallel to an axis passing through the shoulder, interconnected to and driving movement of one of the input elements, and
wherein the first and second motors are positioned within the torso to be spaced from the shoulder.

14. The robot of claim 13, wherein both of the motors are mounted within the torso to provide grounding of the motors.

15. The robot of claim 13, wherein the first and second counterbalances each comprises a counterweight that is mounted within the torso to be spaced apart from the shoulder and to move in one of the DOFs of the differential.

16. The arm apparatus of claim 1, wherein the first and second counterweights provide equal amounts of counter torque to balance the arm link against gravity.

* * * * *